Nov. 27, 1956 R. B. SEELEY 2,772,098
TRAILER HITCH WITH STABILIZER DEVICE
Filed Feb. 17, 1954 3 Sheets-Sheet 1
Fig. 1.
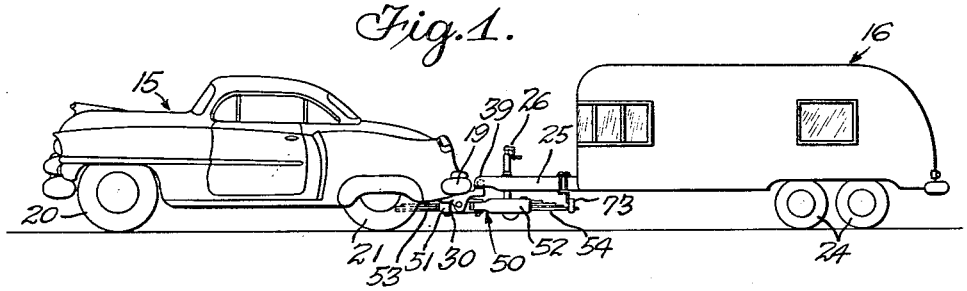
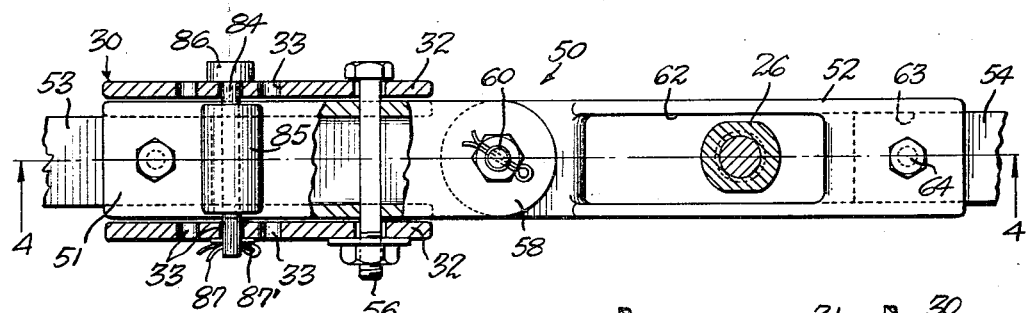
Fig. 3.
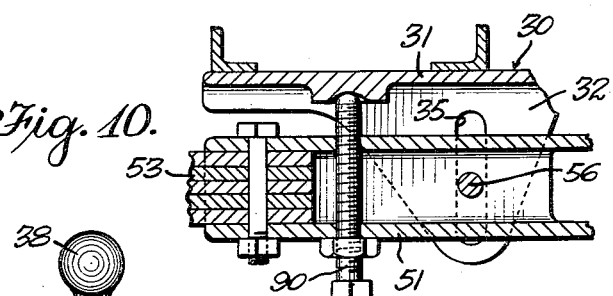
Fig. 10.
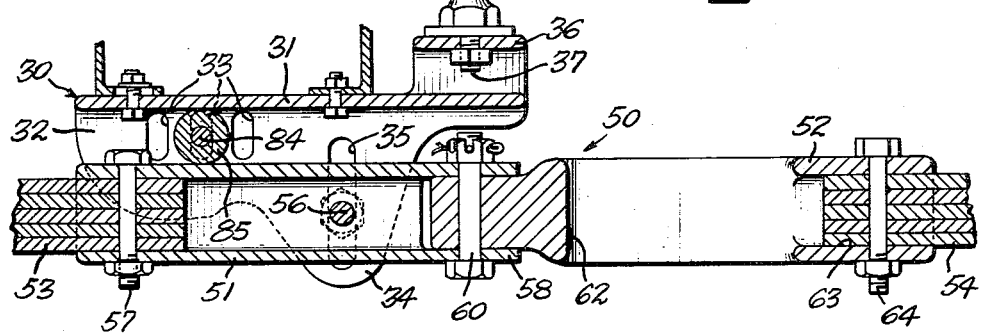
Fig. 4.
INVENTOR.
Ralph B. Seeley.
BY
W. J. Stevenson Nov. 27, 1956  R. B. SEELEY  2,772,098
TRAILER HITCH WITH STABILIZER DEVICE
Filed Feb. 17, 1954  3 Sheets-Sheet 2
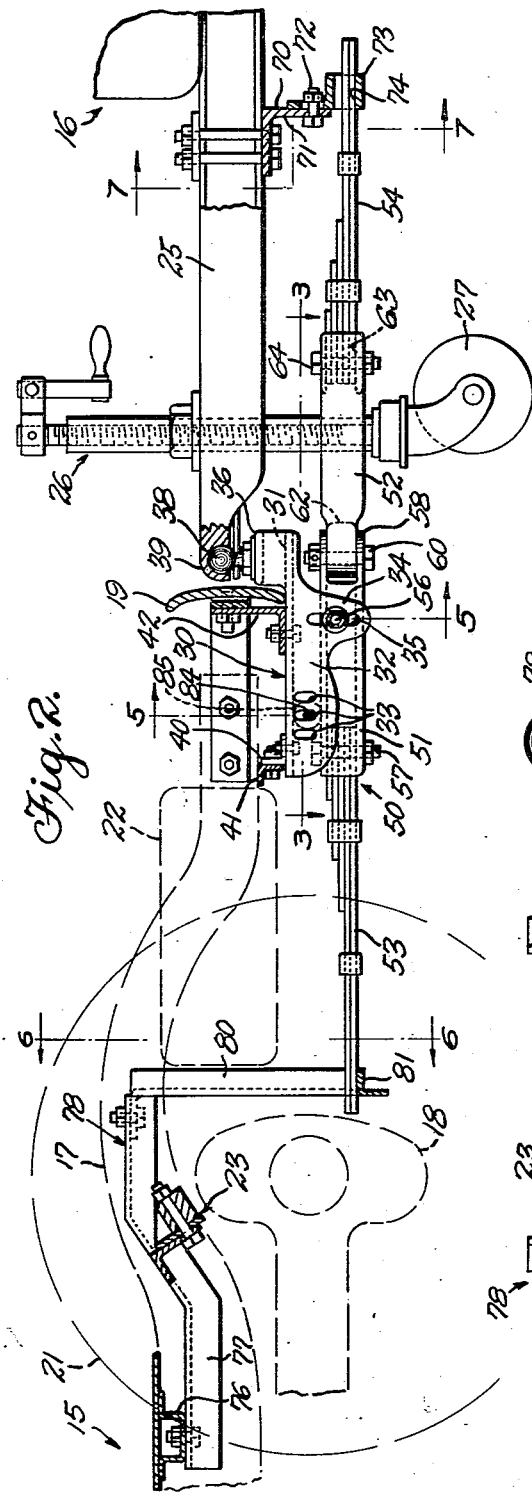
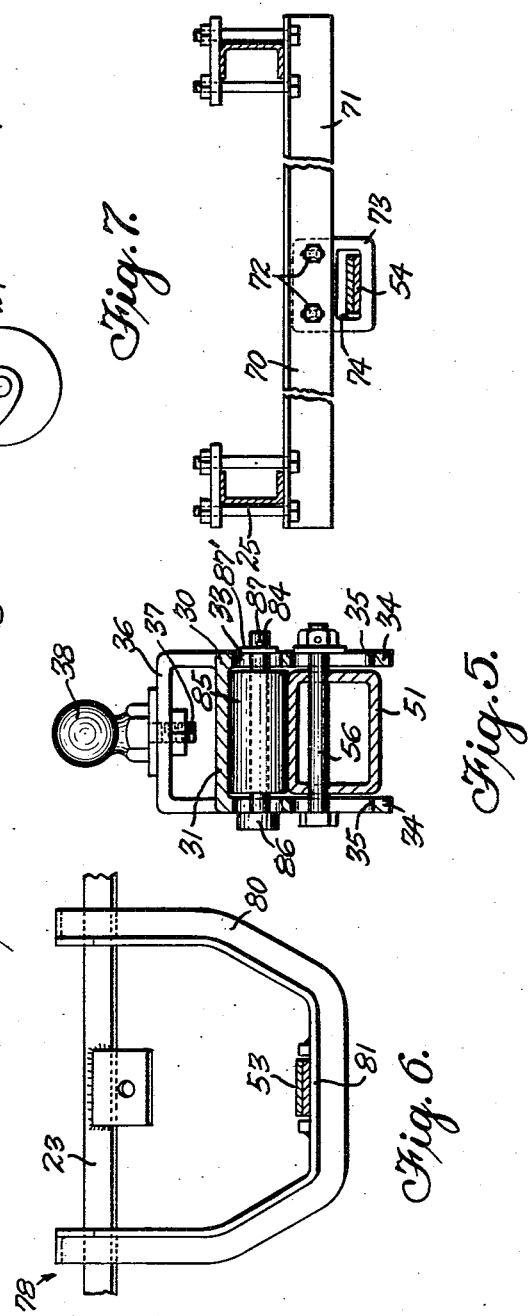
INVENTOR.
Ralph B. Seeley
BY
N. O. Stevenson Nov. 27, 1956    R. B. SEELEY    2,772,098
TRAILER HITCH WITH STABILIZER DEVICE
Filed Feb. 17, 1954    3 Sheets-Sheet 3
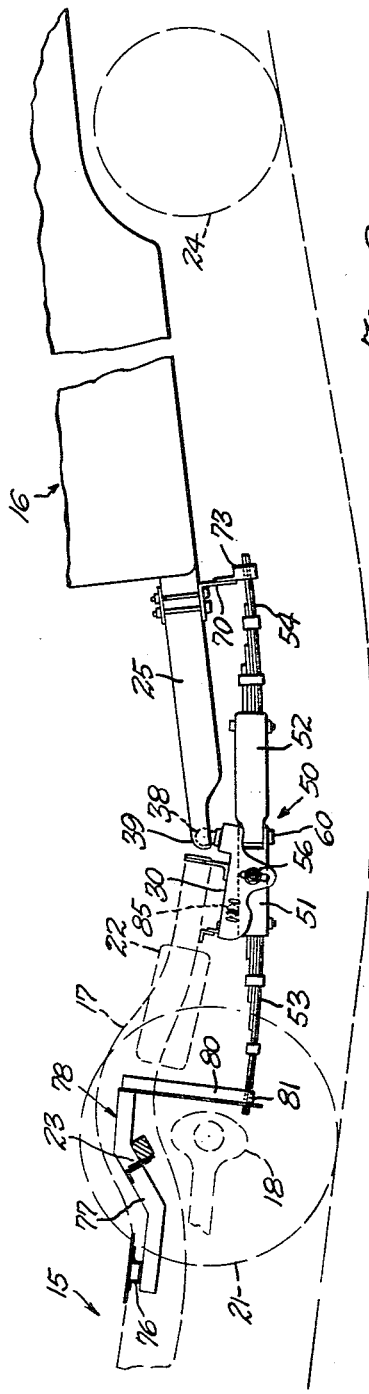
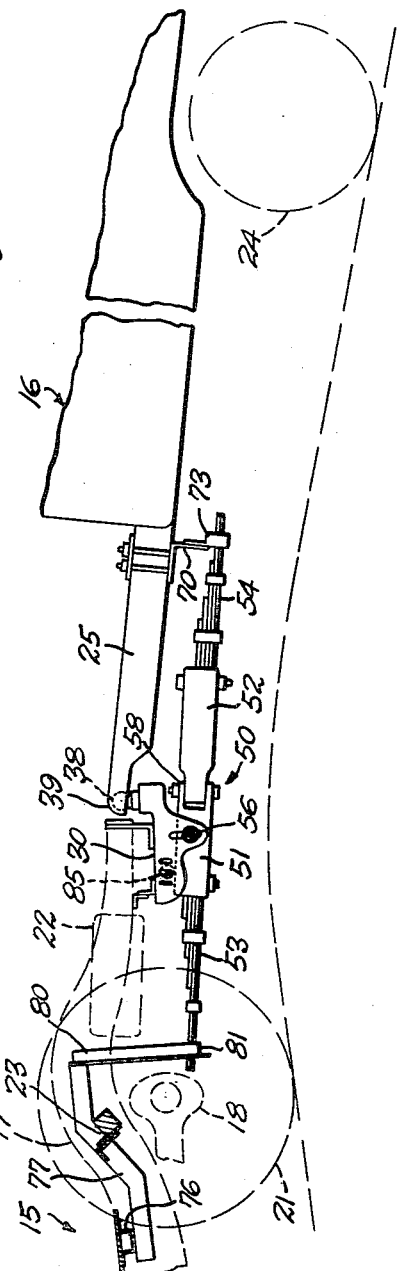
INVENTOR.
Ralph B. Seeley.
BY
H. J. Stevenson United States Patent Office 2,772,098
Patented Nov. 27, 1956

2,772,098

TRAILER HITCH WITH STABILIZER DEVICE

Ralph B. Seeley, Burbank, Calif.

Application February 17, 1954, Serial No. 410,753

11 Claims. (Cl. 280—406)

This invention relates generally to stabilizer devices and more particularly to a stabilizing trailer hitch employed when towing a house trailer behind a motor vehicle.

Various types of hitches are employed for coupling trailers to the rear ends of motor vehicles. The simplest form of trailer hitch consists of a ball carried by a bracket fixedly secured to the rear bumper or other stationary rear part of the car, and a tongue or socket at the forward end of the trailer engageable with the ball to couple the trailer to the vehicle.

Conventional house trailers frequently have a length of approximately forty feet and their wheels are located adjacent the rear end of the trailer to attain maximum maneuverability. Since the major portion of the trailer is located ahead of its wheels, it follows that the "downweight" of this portion is applied directly to the rear end of the vehicle. This condition results in the application of considerable weight upon the rear end of the towing vehicle with the result that the forward end of the trailer and the rear end of the towing vehicle are lowered to a degree wherein the weight of the vehicle becomes unevenly distributed, much of the weight of the vehicle usually supported by the front wheels of the vehicle being transferred to the rear end. Consequently, the vehicle becomes unstable to present a hazardous driving condition which may result in lifting the front wheels on rough roads and upsetting or "jackknifing" of the tandem.

It is therefore an important object of this invention to improve the maneuverability and safety of a vehicle-trailer combination by providing a stabilizer device which functions to relieve the down load of the trailer and to positively transfer a substantial portion of the load to the front end of the vehicle and to the trailer itself, thus effecting maximum stability and driving control at all times. A related object is to provide a stabilizer which is operative to apply simultaneously an upward force against the rear end of the vehicle and a downward force to the front end thereof, such upward force at the rear end also resulting in upward pivotal movement of the front end of the trailer so as to decrease the down load thereof.

Another object of the invention is to provide a stabilizer device which includes a hitch or coupling member fixedly secured to the rear end of the vehicle frame and to which the front end of the trailer is pivotally connected to be towed by the vehicle, and a relatively long stabilizer bar floatingly connected to the coupling member for vertical movement relative thereto. In accordance with an important feature and object of the invention, the ends of the stabilizer bar constructed as strong leaf springs arranged to bear against bracket means carried by the vehicle frame and trailer, the bracket means on the vehicle being operatively positioned forwardly of the rear axle of the vehicle.

By this extremely important feature, a prying or separating action takes place which tends to raise the rear end of the vehicle and lower the front end thereof, the result being that a substantial portion of the down load of the trailer is relieved at the rear end of the vehicle and transferred to the front end thereof. At the same time, the front end of the trailer is raised to transfer a portion of the down weight thereof to its wheels.

Another object of the invention is to provide a stabilizer device, of the character referred to, in which the ends of the multi-leaf springs constituting the ends of the floating stabilizer merely rest upon the brackets carried at the rear end of the vehicle and at the front end of the trailer so as to allow relative longitudinal movement between the spring ends and the brackets.

Another object of the invention is to provide a stabilizer device in which the bar has a central, non-flexible portion constructed in two parts which are pivotally connected by a vertical connecting pin aligned with the ball-and-socket joint to adapt the rearward part to pivot relative to the fore part, as when the car and trailer are traveling around curves in the roadway.

Another object of the invention is to provide a stabilizer device of the class specified in which the fore part of the center portion of the bar is arranged for vertical adjustment between depending wings or flanges of the coupling member and carries a bolt extending through vertical slots in said flanges so as to prevent displacement of the bar.

Another object of the invention is to provide a stabilizer device of the type indicated embodying means for adjusting the relative separation between the coupling member and the flexible stabilizer bar so as to control the degree of upward force applied to the rear end of the towing vehicle and the degree of downward thrust imposed against the front end thereof.

Still further objects of the invention are to provide a stabilizer device which is relatively simple in construction and economical to produce, one which may readily be applied to use in connection with all types of automobiles and trucks without extensive modification in the structure thereof, one which may be conveniently removed from the vehicle when this is desired, and one which is strong and durable in use and highly efficient in performing its intended function.

Further objects of the invention will appear from the following description and from the accompanying drawings which are intended for the purpose of illustration only, and in which:

Fig. 1 is a small scale side view of an automobile and house trailer being towed thereby and showing the present improved stabilizer device applied to use;

Fig. 2 is a larger side elevational view of the stabilizer device and associated parts of the automobile and trailer;

Fig. 3 is a part-sectional plan view of the central portion of the device;

Fig. 4 is a longitudinal sectional view, taken on line 4—4 of Fig. 3;

Figs. 5, 6 and 7 are cross-sectional views, taken respectively on lines 5—5, 6—6 and 7—7 of Fig. 2;

Fig. 8 is a view similar to Fig. 2, showing the relation of the parts of the stabilizer device when the car and trailer travel through a long depression in the highway and which normally would cause additional weight of the trailer to be placed on automobile;

Fig. 9 is a view similar to Fig. 8, illustrating the relation of the parts of the device when the car and trailer are at opposite sides of the summit of a hill; and Fig. 10 is a fragmentary longitudinal sectional view, showing an alternative adjusting means.

Referring to the drawings in detail, the present stabilizing device is illustrated as applied to use in connection with a motor vehicle, much as an automobile 15 which tows or draws a house trailer 16, the vehicle and trailer being conventional. The car 15 has the usual frame having side members 17 which curve upwardly over the rear axle housing 18 (Fig. 2), and a rear bumper 19 at the rear end of the frame. The automobile 15 also has front and rear wheels 20 and 21 and a fuel tank 22. The car frame 17 is provided with cross-members, such as the one shown at 23 which is located forwardly of the housing 18. The trailer 16 has its supporting wheels 24 located adjacent the rear end thereof and has a wishbone type tongue 25 projecting from the forward end, the tongue carrying a vertically adjustable dolly jack 26 for supporting the front end of the trailer when the latter is uncoupled from the automobile, the jack having a swivel wheel 27 adapted to rest upon the ground.

The stabilizer device includes an inverted channel-shaped coupling or hitch-member 30 which has a flat top portion or web 31 and depending side flanges 32. Adjacent their inner ends, the flanges 32 have a series of aligned, horizontally-spaced, vertical slots 33. Toward the outer end of the member 30, its flanges 32 are extended in depending ears 34 which have aligned, elongated verical slots 35. The rear end of the member 30 has an elevated shelf portion 36 which carries a stud 37 provided with a ball 38 at its upper end, a socket 39 at the forward end of the tongue 25 engaging the ball to connect the trailer to the automobile.

The bracket-like hitch member 30 is rigidly attached to the rear end of the car frame 17 with its shelf 36 and swivel ball 38 located rearwardly of the bumper 19. The member 30 may carry angle-iron sections 40 which are adjustably bolted to an angle-iron 41 secured to and extending transversely between the side members of the frame 17, such a transverse angle-iron usually being disposed adjacent the rearward side of the fuel tank 22. A reinforcing angle-iron 42 is secured against the inner side of the bumper 19 and the hitch member 30 is adjustably bolted to the lower horizontal flange thereof (Fig. 2).

The improved stabilizer device also includes a stabilizer bar 50 which, as shown, consists of four main parts, namely, an intermediate bar member 51, a pivoted bar member 52, a front multi-leaf spring 53 and a rear multi-leaf spring 54.

The bar member 51 is of rectangular tubular form (Figs. 2 and 5) and carries a bolt 56 which extends through the elongate vertical slots 35 of the ears 34 of the hitch member 30 so as to retain the member 51 against fore and aft movement while allowing vertical movement thereof. Inserted in the forward end of the member 51 and held in place by a bolt 57 are the rear ends of the leaves of the forward spring 53. The member 51 has a bifurcated rear end 58 across which extends a vertical pivot bolt 60.

The stabilizer bar member 52 has a vertical hole at its forward end for receiving the bolt 60 so as to adapt this member to pivot in a horizontal plane relative to the member 51, it being noted that the pivot bolt is arranged directly below the ball 38 and coaxial therewith. The member 52 has a longitudinal opening 62 through which the shaft or spindle of the dolly jack 26 extends. At its rearward end, the member 52 has a socket 63 receiving the forward ends of the leaves of the rear spring 54, a bolt 64 anchoring the same in the socket.

The trailer tongue 25 is provided with an angle-iron cross member 70, the depending vertical leg 71 of which carries a bolt 72. Fastened against the leg 71 in vertically adjusted position is a rest or bearing element 73 having a rectangular opening 74 through which the free end of the rear spring 54 extends with the spring end resting upon the lower surface of the opening (Figs. 2 and 7).

Secured to and extending transversely between the side members of the car frame 17 is a cross member 76 to which is bolted the forward arms 77 of a frame or bracket 78, it being noted that the cross member is located forwardly of the differential housing 18 of the car. The arms 77 rest upon the cross member 23 of the car frame, this cross member also being disposed slightly forwardly of the housing 18. The bracket 78 also includes a U-shaped element 80 which extends downwardly through the space existing between the differential housing 18 and the fuel tank 22, as shown in Fig. 2. The element 80 has a lower horizontal rest or base 81 upon which the forward free end of the front spring 53 rests (Fig. 6).

It has been stated that the coupling member 30 has a plurality of vertical slots 33 in its side flanges 34. Adapted to extend through any selected aligned pair of these slots is a pin or rod 84 upon which is rotatable, between the flanges 34, a roller 85. The pin 84 has a head 86 abutting one flange 34 and a cotter pin 87 and washer 87' at the other end of the pin retain the latter in position. As will be seen, the roller 85 provides a spacer between the lower surface of the top or web 31 of the coupling member 30 and the upper surface of the member 52 of the floating stabilizer bar assembly 50. Rollers 85 of various diameters will be provided and by selecting a roller of appropriate diameter, the degree of upward thrust exerted by the resilient floating stabilizer bar 50, through the roller against the coupling member 30 and the rear end of the car, to which it is attached, may be varied in accordance with the type and weight of the car, the location of its center of gravity, its spring-loading, and the normal down weight of the trailer to be towed. That is to say, by employing a roller of small diameter, only a small upward thrust is produced. On the other hand, when a roller of relatively large diameter is used, considerable upward thrust is exerted. The roller pin 84 may be positioned to extend through any of the three slots 33 to vary the degree of leverage applied by the stabilizer bar 50 against the rear and front ends of the car.

The stabilizer device parts 30, 38 and 78, 80, having once been installed on the automobile 15, may remain thus attached thereto and, considering this to be the case here, to apply the stabilizer device to use in towing the trailer 16 the following procedure is followed. A spacer roller 85 of selected diameter is first mounted between the wings 34 of the coupling member 30 with its pin 84 extending through, for example, the intermediate slots 33. The stabilizer parts 51, 53 are next mounted in the position shown in Fig. 2, with the member 51 disposed between the ears 34 and with the free end of the spring 53 resting upon the base 81 of the bracket 78. The connecting bolt 56 is next inserted through the slots 35 of the ears 34 and through the aligned holes of the bar member 51.

With the rearward parts 54, 52 projecting from the trailer, the car is maneuvered to locate the ball 38 directly beneath the socket 39 of the trailer tongue 25 which is held elevated by the dolly jack 26. With the free end of the rear spring 54 in the opening 74 of the trailer bearing element 73, the front end of the trailer is lowered by manipulating the jack 26 to cause the socket 29 to embrace the ball 38 to which it is then clamped by conventional means. During such lowering of the front end of the trailer 16, the forward end of the bar member 52 is guided into the bifurcated rearward end 58 of the member 51 and the pivot bolt 60 is then inserted to pivotally connect the parts 51, 53, and 52, 54.

When the trailer 16 has thus been pivotally connected to the automobile 15 and lowered, the down weight of the trailer is applied against the coupling member 30 and thus against the rear end of the car. Assuming for the moment that the stabilizer device is not installed, such downward weight will depress the rear end of the car to such an extent that its center of gravity is moved rearwardly. In this event, much of the weight of the car normally assumed by the front end springs is transferred to the rear end springs so that an unstable condition may exist wherein the rear end of the car sags excessively while the front end of the car, being relieved of considerable load, tends to become lifted from the ground during travel of the car-trailer tandem. Under such a condition, the front end of the trailer also sags downwardly so that manuevering of the car-trailer combination is greatly impaired.

With the floating stabilizer bar 50 installed as explained above and as shown in the drawings, when the down weight of the trailer is applied against the coupling member 30 during lowering of the forward end of the trailer, the roller 85, acting between the coupling member and the bar member 51, functions to depress the latter and this tends to bow the entire bar 50 downwardly with the springs 53 and 54 yielding. However, due to the relatively great strength of these springs little, if any such bowing will occur. Instead, since the springs rest upon fixed portions of the car and trailer and normally tend to assume a straight, unbowed condition, they resist such depressing. While the rear end of the car and the front end of the trailer might otherwise meet in an obtuse included angle, this angle is practically eliminated by the action of the stabilizer bar device.

Now, since the free end of the forward spring contacts the car frame at a point forwardly of the rear axle, through the medium of the bracket means 78, it follows that a portion of the down weight of the trailer is transferred from the rear end to the front end of the car. It is to be particularly observed that as the springs 53 and 54 are loaded, due to the down weight of the trailer, the energy built up in the resilient bar is immediately expended as a downward force reaction exerted against the front end of the car frame which is, in effect, a lever of the first class having its intermediate fulcrum at the rear axle. Consequently, since a downward force is exerted against the forward arm of the lever and an upward force is applied against its rearward arm, the lever (car frame) is placed in a state of substantially equilibrium, that is, with the car frame on an even keel.

In order to bring about this highly desirable result, it is important that the movement arms of the lever (car frame) be so calculated that forces of correctly proportioned magnitude are applied against the front and rear ends. Referring to Fig. 2, it will be seen that the lateral distance from the contact point 23 to the fulcrum (rear axle) is short and only a fraction of the lateral distance of the roller 85 from this fulcrum. Consequently, the upward force applied against the rear end of the car is in excess of the downward force transmitted to the front end thereof. This is important for the reason that should excessive weight be applied to the front end, a "front heavy" situation would exist and this would impair the manueverability of the car and thus cause a hazardous driving condition. In order to bring about the required front end weight versus rear end weight ratio, a roller 85 of proper diameter is selected and installed with its axle or pin 84 located in the particular slot 33 which will provide the moment arm necessary to produce the required force ratio. As will be observed, the roller 85 serves as a wedge between the stabilizer bar 50 and the rear end of the car to pry the latter upwardly.

In lieu of the roller 85, the device may utilize an adjusting screw 90 such as shown in Fig. 10. In this alternative structure, the screw 90 is threaded upwardly through the bar member 51 with its upper end engaging the under side of the coupling member 30. While this means is quite effective in use and provides a minute adjustment, it has the disadvantage of allowing sidewise rocking of the stabilizer bar relative to the car, whereas the roller 85 engages along the entire width of the bar to produce a contact of full width which precludes such rocking motion.

Figs. 8 and 9 are submitted for the purpose of illustrating the action which takes place under certain driving conditions. Referring first to Fig. 8, when the car 15 and trailer 16 travel through a depression or valley in the roadway, the car will assume an upwardly inclined position while the trailer slopes downwardly. In this position, the rear bracket on the trailer for the spring 54 is elevated relative to the coupling member or saddle 30 so that the stabilizer bar is caused to pivot at the roller 85 with the bolt 56 sliding upwardly in the slots 35. Thus, the stabilizer bar adjusts itself to meet this condition, with the ends of its springs 53 and 54 sliding longitudinally and vertically in their supporting brackets on the car and trailer. Should the included angle between the car frame and trailer frame be sufficiently acute as to cause a part of the bar member 51 to engage the saddle member 30, the springs 53, 54 may flex. When this occurs, the stabilizer bar 50 exerts an upward force against the rear end of the car and a downward force against the front end thereof and at the same time transfers much of the weight of the trailer toward its rear end to produce a safe, controllable driving condition.

Considering the situation depicted in Fig. 9 where the vehicle and trailer travel over the summit of a hill, the bar member 51 may pivot on the roller 85 with the bolt 56 riding down in the slots 35 to compensate for lowering of the bearing bracket through which the free end of the rear spring 54 extends. At the same time, pressure of the face end of the forward spring against the bracket 78 may be reduced so as to transfer the weight to the rear end of the vehicle, this weight combined with the down weight of the trailer causing the frames of the vehicle and trailer to assume a more nearly straight relation until the trailer travels over the brow of the hill, following which the parts return to the positions assumed when the car and trailer are traveling along a straight highway.

It has been explained that under normal operating conditions a portion of the down weight of the trailer is transmitted to the front end of the towing vehicle and such down weight is also reduced by transferring a portion thereof to the wheels of the trailer. Considering a typical example, checking the weight distribution of an automobile of 4910 pounds total weight which is to be connected to tow a trailer of 5472 pounds total weight, it has been found that the front end weight of the car equals 2130 pounds while the rear end weight equals 2780 pounds. Checking the weight distribution of the trailer, it is found that the weight at its forward yoke or drawbar is 586 pounds while the weight at its wheels is 4886 pounds.

With the same car and trailer connected by means of the present stabilizer device and ready for travel, it is found that the front end weight of the car is now 2380 pounds while rear end weight is 2498 pounds. It is also found that the draw-bar weight is now 286 pounds. This means that a weight of 250 pounds has been transferred to the front end of the car while the weight supported by the rear end thereof has been reduced by 282 pounds. It also shows that the draw-bar weight is now 300 pounds and that the total weight of the trailer is now 5504 pounds. It is seen, therefore, that weight of 32 pounds has been transferred to the trailer and, since the draw-bar weight is now 286 pounds, a reduction of 300 pounds, it is apparent that weight at the wheels of the trailer has been increased by 332 pounds. By means of the instant stabilizer device, then, the weight normally carried at the rear end of the towing vehicle is substantially diminished, this weight being transmitted to both the front end of the car and the rear end of the trailer so that the car and trailer remain substantially level and a safe driving condition is assured at all times.

In accordance with the provisions of the patent statutes, I have herein described the principle of the invention, together with the construction of the device which I now consider the best embodiment thereof. I wish to have it understood, however, that various modifications might be made in the structure without departing from the spirit or scope of the invention, as defined in the appended claims.

I claim as my invention:

1. A stabilizing trailer hitch for connection between a spring-supported frame of a towing vehicle and a trailer, comprising: a coupling member secured to the vehicle, rearwardly of its rear axle, and having a ball engageable by a socket at the front end of the trailer to connect the trailer to the vehicle for relative lateral and vertical pivotal movement; a first bearing bracket carried by the spring-supported frame of the vehicle forwardly of the rear axle; a second bearing bracket carried by the trailer frame adjacent its front end; a stabilizer bar having resilient forward and rearward ends engageable respectively with said first and second bearing brackets, an intermediate portion of said bar being disposed beneath said coupling member, said rearward end of the stabilizer bar being pivotally connected to said intermediate portion on a vertical axis aligned with said ball; interengaging means on said coupling member and said bar for retaining the bar longitudinally in place; and means engageable between said coupling member and said stabilizer bar and providing a vertical spacer therebetween.

2. A stabilizing trailer hitch as defined in claim 1 in which said spacer means consists of an adjusting screw on said intermediate portion engaging the under side of said coupling member.

3. A stabilizing trailer hitch as defined in claim 1 in which said resilient ends of said stabilizer bar consist of multi-leaf springs of relatively great strength.

4. A stabilizing trailer hitch as defined in claim 1 in which said resilient ends of said stabilizer bar consist of multi-leaf springs of relatively great strength, and in which said first and second bearing brackets have vertical openings therein providing lower horizontal bearing rests supporting the free ends of said leaf springs.

5. A stabilizing trailer hitch for connection between a spring-supported frame of a towing vehicle and a trailer, comprising: a coupling member secured to the vehicle, rearwardly of its rear axle, and having a ball engageable by a socket at the front end of the trailer to connect the trailer to the vehicle for relative lateral and vertical pivotal movement, said coupling member having a plurality of longitudinally-spaced vertical slots located forwardly of said ball; a first bearing bracket carried by the spring-supported frame of the vehicle forwardly of the rear axle; a second bearing bracket carried by the trailer frame adjacent its front end; a stabilizer bar having resilient forward and rearward ends engageable respectively with said first and second bearing brackets, an intermediate portion of said bar being disposed beneath said coupling member, said rearward end of the stabilizer bar being pivotally connected to said intermediate portion on a vertical axis aligned with said ball; interengaging means on said coupling member and said bar for retaining the bar longitudinally in place; and a roller rotatable on an axle pin, the ends of the pin being insertable through a selected pair of said vertical slots, said roller being engageable between said coupling member and said stabilizer bar and providing a vertical spacer therebetween.

6. A stabilizing trailer hitch for connection between a spring-supported frame of a towing vehicle and a trailer, comprising: a coupling member secured to the vehicle, rearwardly of its rear axle, and having a ball engageable by a socket at the front end of the trailer to connect the trailer to the vehicle for relative lateral and vertical pivotal movement; a first bearing bracket carried by the spring-supported frame of the vehicle forwardly of the rear axle; a second bearing bracket carried by the trailer frame adjacent its front end; a stabilizer bar having resilient forward and rearward ends engageable respectively with said first and second bearing brackets, an intermediate portion of said bar being disposed beneath said coupling member, said rearward end of the stabilizer bar being pivotally connected to said intermediate portion on a vertical axis aligned with said ball; interengaging means on said coupling member and said bar for retaining the bar longitudinally in place; and a spacer means carried by said coupling member and engaging said intermediate portion of the stabilizer bar to maintain the same at a predetermined height relative to said bracket means.

7. A stabilizing trailer hitch as defined in claim 6 in which said spacer means consists of a roller of selected diameter carried by an axle arranged to extend through selected slots of a series of longitudinally-spaced vertical slots in said coupling member, said roller providing a fulcrum about which said stabilizer bar can pivot.

8. A stabilizing trailer hitch as defined in claim 6 in which said spacer means consists of a roller of selected diameter carried by an axle arranged to extend through selected slots of a series of longitudinally-spaced vertical slots in said coupling member, said roller providing a fulcrum about which said stabilizer bar can pivot, said interengaging retainer means consisting of a horizontal bolt on said intermediate portion of the stabilizer bar extending through a vertical slot in said coupling member to allow pivotal movement of the bar.

9. A stabilizing trailer hitch for connection between a spring-supported frame of a towing vehicle and a trailer, comprising: a coupling member secured to the vehicle, rearwardly of its rear axle, and having a ball engageable by a socket at the front end of the trailer to connect the trailer to the vehicle for relative lateral and vertical pivotal movement; a first bearing bracket carried by the spring-supported frame of the vehicle forwardly of the rear axle; a second bearing bracket carried by the trailer frame adjacent its front end; a stabilizer bar having resilient forward and rearward ends engageable respectively with said first and second bearing brackets, an intermediate portion of said bar being disposed beneath said coupling member, said rearward end of the stabilizer bar being pivotally connected to said intermediate portion on a vertical axis aligned with said ball; interengaging means on said coupling member and said bar for retaining the bar longitudinally in place; and means adjustably engageable between the coupling member and said intermediate portion of the stabilizer bar to maintain the same at a predetermined height relative to said bracket means.

10. A stabilizing trailer hitch for connection between a spring-supported frame of a towing vehicle and a trailer, comprising: a coupling member having a top portion secured to the vehicle rearwardly of its rear axle to extend longitudinally of the vehicle, and side flanges depending from said top portion, said flanges having a plurality of aligned, vertically extending, longitudinally-spaced, slots adjacent their forward ends and aligned, vertically extending openings at their rearward ends, said coupling member carrying a ball engageable by a socket at the front end of the trailer to pivotally couple the trailer to the vehicle; a first bearing bracket connected to the spring-supported frame of the vehicle forwardly of the rear axle thereof, said bracket extending rearwardly from its point of connection above the rear axle and downwardly at the rear of the axle and terminating in a horizontal rest; a second bearing bracket connected to the front end of the trailer and arranged for vertical adjustment thereon, said second bracket having an opening providing a lower rest; a stabilizer bar having an intermediate member extending longitudinally between the side flanges of the coupling member, said member carrying a retainer bolt extending through said vertical openings of the coupling member; and a roller having an axle extending through selected aligned slots of the coupling member and engaging between the top portion of this member and the upper surface of said intermediate member, said stabilizer bar also including a rear member pivotally connected to said intermediate member directly beneath said ball, said intermediate and rear members having spring sockets at their respective forward and rearward ends, said stabilizer bar further including leaf springs each having an end secured within a said spring socket, the free end of the spring connected to said intermediate member engaging upon said rest of said first bearing bracket, and the free end of the other spring engaging upon said rest of said second bearing bracket.

11. A stabilizing trailer hitch for use between the rear end of a towing vehicle and the front end of a trailer being towed, said vehicle and trailer having frames, comprising: a coupling member carried by said vehicle frame and having a ball, said trailer frame having a forwardly projecting tongue provided with a socket receiving said ball, said ball and socket connecting said vehicle and trailer for relative pivotal movement; a first bracket secured to the vehicle frame forwardly of the rear axle of the vehicle and providing a first bearing rest; a second bracket secured to the trailer frame adjacent the front end thereof and providing a second bearing rest; a floating stabilizer bar extending longitudinally beneath the rear end of the vehicle and the front end of the trailer, said bar having flexible free ends resting upon said first and second bearing rests; and an element engaging between an intermediate portion of the bar and the rear end of the vehicle frame, said free end of said bar resting upon said second bearing rest being pivotally connected to said intermediate portion on a vertical axis located directly below said ball-and-socket connection.

References Cited in the file of this patent

UNITED STATES PATENTS

| | | |
|---|---|---|
| 1,637,665 | Stone | Aug. 2, 1927 |
| 2,517,047 | Spitler | Aug. 1, 1950 |
| 2,572,341 | Hoffman | Oct. 23, 1951 |
| 2,643,891 | Mosley | June 30, 1953 |
| 2,680,626 | Hedgpeth | June 8, 1954 |